United States Patent [19]

Kitauchi

[11] Patent Number: 4,674,291
[45] Date of Patent: Jun. 23, 1987

[54] DECENTRALIZATION TYPE CONTROL APPARATUS FOR AN AIR-CONDITIONING OR A REFRIGERATING APPARATUS

[75] Inventor: Hajime Kitauchi, Nagasaki, Japan

[73] Assignee: Mitsubishi Denki Kabushiki Kaisha, Tokyo, Japan

[21] Appl. No.: 849,367

[22] Filed: Apr. 9, 1986

Related U.S. Application Data

[63] Continuation of Ser. No. 656,331, Oct. 1, 1984, abandoned.

[30] Foreign Application Priority Data

Sep. 30, 1983 [JP] Japan .................................. 58-183828

[51] Int. Cl.⁴ .......................................... F25B 49/00
[52] U.S. Cl. ...................................... 62/126; 236/94
[58] Field of Search ........................ 62/125, 126, 127; 236/94; 165/11 R, 22; 364/184, 187, 185, 557

[56] References Cited

U.S. PATENT DOCUMENTS 4,212,078  7/1980  Games et al. ..................... 165/22 X
4,333,316  6/1982  Stamp, Jr. et al. ................... 62/126
4,381,549  4/1983  Stamp, Jr. et al. ................... 62/126

Primary Examiner—Harry Tanner
Attorney, Agent, or Firm—Oblon, Fisher, Spivak, McClelland & Maier

[57] ABSTRACT

A decentralization type control apparatus for an air-conditioning or a refrigerating apparatus comprising a plurality of terminal control units and a central control unit for controlling the plurality of terminal control units. Each of the terminal control units is provided with a monitoring and controlling section for monitoring operations of the central control unit, a first memory part which stores information output from the central control unit through the monitoring and controlling section and information input into the terminal control unit itself, a second memory part storing a control program for a load, a control part for controlling the air conditioning or refrigerating apparatus by the information stored in the memory parts, and an output part generating an alarm to the outside, wherein when a fault in the central control unit is detected by the monitoring and controlling section, the terminal control unit solely takes over operations to control the air-conditioning or refrigerating apparatus and generates from the output part an alarm informing the fault of the central control unit.

2 Claims, 6 Drawing Figures

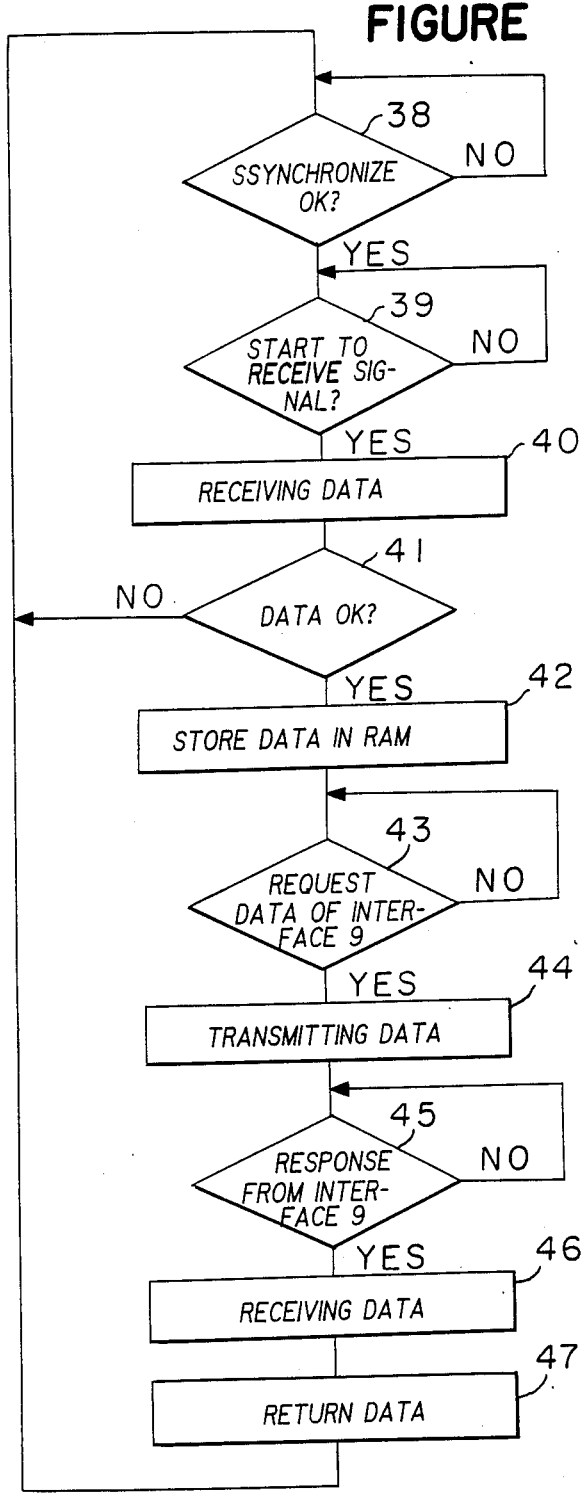

DECENTRALIZATION TYPE CONTROL APPARATUS FOR AN AIR-CONDITIONING OR A REFRIGERATING APPARATUS

This application is a continuation of application Ser. No. 656,331 filed Oct. 1, 1984 abandoned.

BACKGROUND OF THE INVENTION

1. Field of the Invention

The present invention relates to an air-conditioning or a refrigerating system concentrically controlling a plurality of air-conditioners or refrigerators installed at separate positions and their related devices.

2. Description of Prior Art

There has so far been known an apparatus of this kind as shown in FIG. 1. In FIG. 1, a reference numeral 1 designates a central control unit, numerals 2a, 2b, 2c, 2d and 2e designate terminal control units for controlling air conditioners or refrigerators, a numeral 3 designates a backup control unit used for the central control unit 1 at the time of the breaking down of it, a numeral 4 designates a transmission line to transmit information for control from the backup control unit 3 to each of the terminal control units 2a, 2b, 2c, 2d and 2e and vice versa, numerals 5a, 5b, 5c, 5d and 5e designate loads such as air conditioners or refrigerators connected to each of the terminal control units.

The operation of the conventional control apparatus will be described.

Under ordinary circumstances, information to control each of loads 5a–5e, analogue data such as temperature and pressure for air conditioning or refrigerating operations and digital data such as operating condition or abnormal condition are input to each of the terminal control units 2a, 2b, 2c, 2d and 2e and the input data are transmitted to the central control unit 1 through the transmission line 4.

The central control unit 1 receives information to control each of the loads 5a–5e, information for registration such as a type of load, control mode, order of operations, information to be set such as temperature, time, and information for command such as start or stoppage by means of a key board, and performs operations for temperature control, timer control and so on by using the input information as above-mentioned and another input information supplied from each of the terminal control units 2a–2e.

A result of the operations is supplied to each of the terminal control units 2a–2e through the transmission line 4, as output data for controlling the loads 5a–5e.

Each of the terminal control units 2a–2e receives the output data; converts the output data into data capable of controlling each of the loads and gives an output for control, as a relay output, to each of the loads. However, if the central control unit 1 becomes faulty by any cause such as current service interruption, breakdown or run away, the result of operation for control, namely information for controlling the output of the loads disappears from each of the terminal control units 2a–2e whereby it is impossible to control the loads and the entire system is broken down. To avoid such disadvantage, there has been provided a backup control unit 3 which monitors the central control unit 1 and controls the terminal control units instead of the same at the time of breaking-down of the central control unit 1 to continue controlling operations for the entire system, and at the same time the backup control unit 3 generates an alarm of the breaking-down of the central control unit 1 to the outside of the system.

Since the conventional decentralization type control apparatus has been highly depending on the central control unit 1, if the central control unit is broken down by any cause, there has resulted breaking-down of the entire system. It has, therefore, been necessary to install a backup control unit having the same capacity as the central control unit to continue operations of the system. The provision of the back up control unit has necessarily pushed up a cost for the control apparatus.

SUMMARY OF THE INVENTION

It is an object of the present invention to eliminate the disadvantage of the conventional control apparatus and to provide a decentralization type control apparatus which allows each terminal control unit to continue automatically, solely operations without a backup control unit at the time of breaking-down of a central control unit by letting each of the terminal control units have operation-control function of the central control unit, a substantial part of inputting function and storing function of information which the central control unit possesses and monitoring function performed by the central control unit.

The foregoing and the other objects of the present invention have been attained by providing a decentralization type control apparatus for an air-conditioning or a refrigerating apparatus comprising a plurality of terminal control units and a central control unit for controlling said plurality of terminal control units, wherein each of the terminal control units is provided with a monitoring and controlling section for monitoring operations of the central control unit, a first memory part which stores information output from the central control unit through the monitoring and controlling section and information input into the terminal control unit itself, a second memory part storing a control program for a load, a control part for controlling the air conditioning or refrigerating apparatus by the information stored in the memory parts, and an output part generating an alarm to the outside, wherein when a fault in the central control unit is detected by the monitoring and controlling section, the terminal control unit solely takes over the operations to control the air-conditioning or refrigerating apparatus and generates from the output part an alarm informing the fault of the central control unit.

BRIEF DESCRIPTION OF DRAWING

FIG. 6 is a flow chart showing the steps of operation of the monitoring and controlling part.

PREFERRED EMBODIMENT OF THE PRESENT INVENTION

An embodiment of the decentralization type control apparatus for an air conditioning or refrigerating apparatus according to the present invention will be described with reference to drawing.

Figure 1:
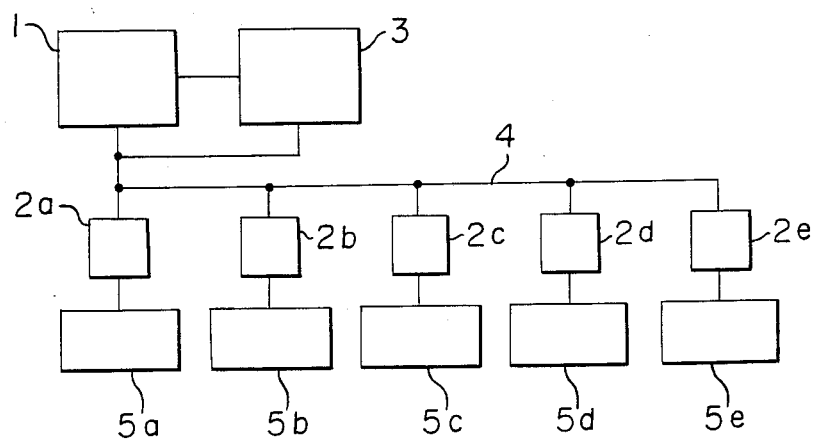
FIG. 1 is a block diagram of a conventional decentralization type control apparatus for an air conditioning or refrigerating apparatus.
Figure 2:
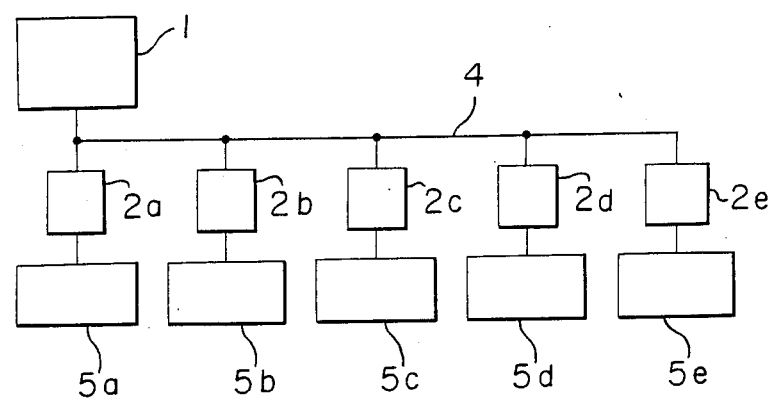
FIG. 2 is a block diagram showing the entirety of an embodiment of the decentralization type control apparatus of the air conditioning or refrigerating apparatus according to the present invention.

FIG. 2 is a block diagram showing a construction of one embodiment of the present invention, wherein a reference numeral 1 designates a central control unit; numerals 2a, 2b, 2c, 2d and 2e designate terminal control units for controlling an air conditioning or refrigerating appartus; a numeral 4 designates a transmission line for transmitting information for control from the central control unit 1 to each of the terminal control units 2a, 2b, 2c, 2d and 2e and vice versa; and numerals 5a, 5b, 5c, 5d and 5e designate loads such as air conditioners or refrigerators, each connected to each of the terminal control units. As apparent from FIG. 2, a backup control unit 3 as shown in FIG. 1 is eliminated.

Figure 3:
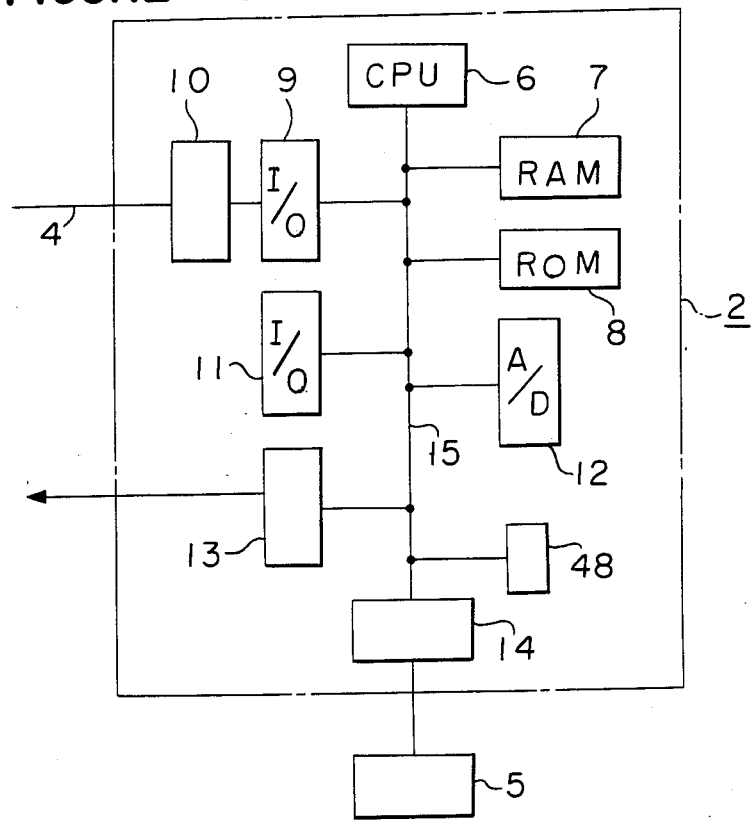
FIG. 3 is a block diagram showing a construction of a terminal control unit in the decentralization type control apparatus according to the present invention.

FIG. 3 is a block diagram showing an internal construction of the each of the terminal control units 2. Since each of the terminal control units 2a–2e shown in FIG. 2 have the same construction, the terminal control unit shown in FIG. 3 is represented by the numeral 2 on behalf of all of the terminal control units.

In FIG. 3, a reference numeral 6 designates a central processing unit (hereinbelow referred to as CPU); a numeral 7 designates a RAM for storing command setting information from the central control unit 1 or the terminal control unit itself and information such as temperature, pressure etc. and a numeral 8 designates a ROM having an operation program such as temperature control on the basis of the information of the RAM 7, and the ROM 8 being connected to the CPU 6 through a bus 15. The bus 15 is connected through an interface 9 as an information input/output unit 1 and a monitoring and controlling section 10 to the transmission line 4, the monitoring and controlling section being capable of interchanging information with the central control unit 1 through the interface 9. There are connected to the bus 15 a key board interface 11 for inputting command/setting information, an A/D converter 12 for receiving analogue data such as temperature, pressure etc. to convert them digital values, an output interface 13 outputting an alarm to the outside when abnormality of the central control unit 1 is detected, an input/output interface 14 for controlling an air conditioner or a refrigerator as an object to be controlled and a timer 48 used for controlling operations in the CPU 6.

The bus 15, as apparent from the foregoing description, performs transmission of data, addresses and control signals among the CPU 6, the RAM 7, the ROM 8, the interface 9, the monitoring and controlling section 10, the key board interface 11, the A/D converter 12, the output interface 13, the input/output interface 14 and the timer 48.

Figure 5:
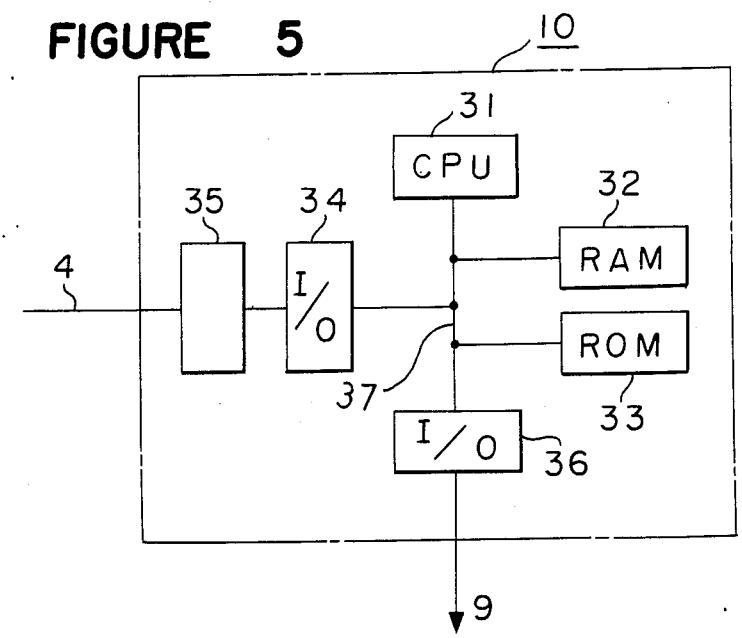
FIG. 5 is a block diagram showing an internal construction of an embodiment of the monitoring and controlling section of the present invention.

FIG. 5 is a block diagram showing an internal construction of the monitoring and controlling section 10. The monitoring and controlling section 10 is constituted by a central processing unit 31 (hereinbelow referred to as CPU), a RAM 32 for storing information sent from the central control unit 1 and the interface 9, a ROM 33 holding commands and an operation program to be executed by the CPU 6, an interface 36 for inputting and outputting information to and from the interface 9 and a modulation/demodulation device 35 connected to the transmission line 4. A numeral 34 designates an interface for inputting and outputting information to and from the modulation/demodulation device 35. The CPU 31, the RAM 32, the ROM 33, the interface 34 and the interface 36 are connected to a bus 37 which is a transmission line for transmitting data, addresses and control signals to them.

The operation of the decentralization type control apparatus for an air conditioning or refrigerating apparatus as constructed above-mentioned will be described.

The central control unit 1 cyclically communicates each of the terminal control units 2a–2e. Namely, the central control unit 1 communicates with the terminal control units in such a manner that it firstly communicates with the unit 2a, secondly with the unit 2b, thirdly with the 2c, fourthly with the unit 2d and finally with the unit 2e, the communication being recycled. Accordingly a specific terminal control unit communciates with the central control unit 1 at a fixed time interval.

The operation of the monitoring and controlling section 10 will be described with reference to the flow chart of FIG. 6.

The CPU 31 executes operations according to the operation program in the ROM 33. The CPU 31 checks synchronization of a signal in the modulation/demodulation device 35 through the interface 34. If the synchronization of signal is not attained, the same instruction is provided (Step 38). When synchronized, there becomes mode of waiting information from the central control unit 1 and the device 35 waits to receive a first signal (Step 39). On starting receipt of signal, the CPU 31 receives data from the modulation/demodulation device 35 through the interface 34 (Step 40). The CPU 31 compares the data received with data stored in the RAM 32 to check whether or not they are correct data for CPU 31 and correct data is sent to the next step while incorrect data is returned to Step 38 (Step 41). If the data received is correct, the data is stored in the RAM (Step 42). Then, the CPU 31 waits to receive a request of data from the interface 9 (Step 43). When the CPU 31 receives the request from the interface 9, it takes the data already received from the RAM 32 and transmits the data to the interface 9 through the interface 36 (Step 44). The CPU 31 waits to receive a response from the interface 9 (Step 45). On receiving the response, the CPU 31 receives the data from the interface 9 through the interface 36 (Step 46) and transmits them to the modulation/demodulation device 35 through the interface 34 so as to return the data to the central control unit 1 (Step 47), thereafter returning to Step 38.

Figure 4:
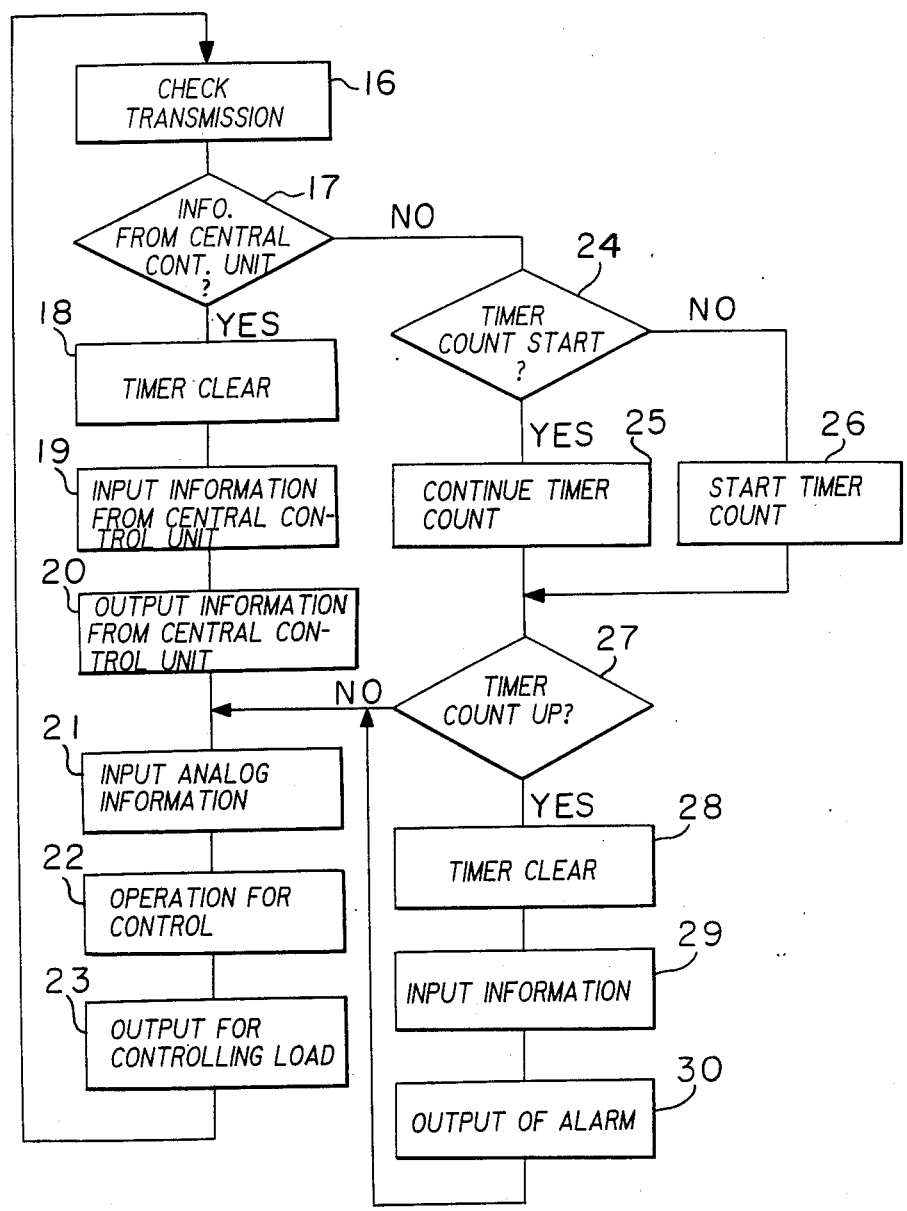
FIG. 4 is a flow chart showing steps of the operation of the terminal control unit shown in FIG. 3.

The operation of the terminal control unit 2 will be described with reference to the flow chart of FIG. 4.

The CPU 6 executes operation according to an operation program in the ROM 8. The CPU 6 checks whether there is information from the central control unit 1, in other words, the CPU 6 requests the monitoring and controlling section 10 to send information through the interface 9 (Step 16). If information is present (namely, the monitoring and controlling section 10 is at Step 45 in FIG. 6), then, the operation of Step 18 is taken. If absent (namely, the monitoring and controlling section is at Step 38, Step 39 or Step 41 in FIG. 6), then, the operation of Step 24 is taken. When the information is detected, the CPU 6, after having cleared the timer 48 (Step 18), receives data from the monitoring and controlling section 10 through the interface 9 (the operation of the section 10 corresponds to Step 44 in FIG. 6) to store the received data in the RAM 7 (Step 19). The data are command/setting information to control a load.

The CPU 6 takes information monitored by the central control unit 1, condition of operation of the load, analogue information and so on from the RAM 7 and transmits them to the central control unit 1 through the interface 9 and the monitoring and controlling section 10 (Step 20) (the operation of the section 10 corresponds to Step 46 in FIG. 6).

The CPU 6 inputs analogue information such as temperature, pressure in the air conditionor or the refrigerator to the A/D converter to store the information in the RAM 7 (Step 21).

Then, the CPU 6 operates for control by using the information for control such as the command/setting information, analogue information stored in the RAM 7 and programs such as temperature control, timer control stored in the ROM 8 (Step 22).

On the basis of a result of the operation, the CPU 6 performs control of an output to a load such as an air conditionor or a refrigerator through the interface 14 (Step 23).

If there is no information from the central control unit 1, namely when the CPU 6 requests information to the monitoring and controlling section through the interface 9, the CPU 31 in the monitoring and controlling section 10 does not wait the request (cases of Step 38, Step 39 and Step 41 in FIG. 6), the CPU 6 discriminates that the monitoring and controlling section 10 is incapable of responding and then, operation of Step 24 is taken in which the CPU 6 discriminates whether the timer 48 has started to count (Step 24). If the timer has started to count, the operation is continued (Step 25). If not, the CPU 6 has the timer 48 started to count (Step 26) and then, the operation of Step 27 is taken. In Step 27, the CPU 6 compares a period of data containing information from the central control unit, stored in the ROM 8 with a counted value. The CPU 6 determines the central control unit to be broken down, if the counted value of the timer is greater and receives the command/setting information from the key board interface 11 after having cleared the timer 48 (Step 28), and store it in the RAM (Step 29).

The CPU 6 generates an alarm of breaking-down of the central control unit through the input/output interface 13 (Step 30) and then operation is returned to Step 21. If the counted value of the timer 48 is smaller than a period of data in the information from the central control unit according to the ROM 8, the CPU 6 does not take any step (Steps 28, 29 and 30) for breaking-down of the central control unit and operation is returned to Step 21.

The inforamtion such as command or setting information input at Step 19 or Step 29, to be stored in RAM 7 can be eliminated unless such information is different from the previous condition.

At the time of breaking-down of the central control unit, operations to change the command or setting information can be effected by the key board interface 11 provided in the terminal control unit.

In the embodiment described above, a timer constituted by a programmed soft wear is utilized to check the time period of the information from the central control unit for detection of the breaking-down of the central control unit. However, it is possible to use a timer constituted by hardwear to obtain the same effect as in the embodiment.

The monitoring function for the central control unit provided in the terminal control unit can be utilized by using an information input/output device for the central control device.

It is unnecessary for the central control unit to have controlling and operating function for the air conditioner and refrigerator since such function is provided in the terminal control unit.

Even in the decentralization type control apparatus, it is necessary to have information inputting function for setting a command in the terminal control unit by effecting key operations at decentralized places. Accordingly, the manufacturing cost of the embodiment according to the present invention is substantially the same as the conventional decentralization control apparatus without the backup control unit.

Thus, the decentralization type control apparatus for an air conditioning or refrigerating apparatus according to the present invention has the advantage of capable of continuous operation as a system without the backup control unit for the central control apparatus while being substantially the same manufacturing cost as the conventional one, by monitoring the central control unit at each of the terminal control units, by continuing controlling operation of the air conditioners and/or refrigerators by only the terminal control unit at the time of breaking-down of the central control unit and generating an alarm to the outside.

I claim:

1. A decentralized type control apparatus for an air-conditioner or refrigeration apparatus having a plurality of terminal control units and a central control units for controlling said plurality of terminal control units wherein each of said terminal control units comprises:
   input means for inputting information into each of said terminal control units;
   monitoring and controlling means coupled to said central control unit for monitoring the operation of said central control unit;
   first memory means coupled to said monitoring and controlling means for storing information outputed from said central control unit and for storing said information inputed into said terminal control unit via said input means;
   second memory means for storing a control program for a load;
   terminal control means coupled to said first and second memory means and said air conditioning or refrigeration apparatus for controlling said apparatus based on the information stored in said first and second memory means;
   detecting means coupled to said central control unit for detecting a fault condition;
   fault controlling means coupled to said detecting means for allowing said terminal control unit to continue operation during any detected fault in said central control unit;
   temperature setting means contained within said terminal control means for adjusting the temperature setting of air-conditioner or refrigeration apparatus; and
   output means coupled to said detecting means for generating an alarm to the outside.

2. The decentralization tyep control apparatus according to claim 1, wherein said monitoring and controlling means comprises a CPU, a RAM, a ROM, an interface for inputting and outputting information to and from said interface of said terminal control unit, an interface for inputting and outputting information to and from a modulation/demodulation device.

* * * * *